United States Patent Office 2,872,325
Patented Feb. 3, 1959

2,872,325

PROCESS FOR COATING PERISHABLE FOODSTUFFS

Charles R. Scott and Dallas G. Grenley, Midland, Mich., assignors to The Dow Chemical Company, Midland, Mich., a corporation of Delaware No Drawing. Application October 25, 1956
Serial No. 618,174

4 Claims. (Cl. 99—166)

This invention relates to a new and improved process for coating perishable foods. More particularly it relates to a process for providing such coatings which are self-polishing and non-waxy.

It is known that many ripened foodstuffs are subject to rapid dehydration after harvesting and during storage. That dehydration which is noticeable by a shriveling of the ring or skin causes such foodstuffs to be unmerchantable and to lose some of their food value and their palatability. Among such foodstuffs may be mentioned oranges, grapefruit, lemons, and other citrus fruit, cantaloupes, tomatoes, and cucumbers. Eggs also are degraded through dehydration. It has been the practice for many years to apply a waxy coating or mineral oils to such foodstuffs to retard dehydration. Those waxes were usually natural waxes and were applied from solution. Many techniques, processes, and apparatuses have been developed for applying such waxes. The most common and widely used process is a spray waxing technique in which the wax is sprayed from a highly volatile organic solvent. In any spraying technique it is absolutely necessary that the wax be completely dissolved, or clogging of the spray nozzles will occur. When using highly volatile solvents it is difficult to prevent evaporation from occurring with the precipitation or gelation of difficulty soluble materials. Further, the use of organic solvents presents problems of flammability and toxicity. A still further consideration in the merchandising of such foodstuffs is to provide the foodstuff with a high luster or gloss to attract the consumer's eye. With the prior used wax coatings it was usually necessary to brush the foodstuff to attain the desired gloss which necessitated an extra handling step and presented opportunities for bruising the foodstuff.

In more recent times the use of certain soluble synthetic resins has come into use with the spraying technique. Those resins still required an organic solvent and the same equipment as the spray waxing methods. The main advantage that was realized from the synthetic resin solutions was their drying to a high gloss, eliminating the brushing step.

An important consideration in the coating of foodstuffs is that the coating must not be impermeable but must allow a small but essential amount of transpiration to occur. It has been found that air-tight enclosures about foodstuffs cause anaerobic respiration which results in the development of undesirable flavors.

It is the principal object of this invention to provide an improved process for coating perishable foods.

An other object is to provide such a process which does not employ organic solvents.

It is a further object to provide such a process whereby the foods attain a high gloss without a separate polishing step.

The above and related objects are accomplished by means of a process whereby the food to be coated is washed and then covered with certain film-forming polymer latexes and the coating allowed to dry.

The foodstuffs which are to be protected in accordance with this invention are those fresh foodstuffs having a rind, shell, skin or other natural protective covering which is normally disposed of prior to consumption and which foodstuffs are subject to deterioration through dehydration, the growth of microorganisms, or chemical oxidation. Among those foodstuffs may be mentioned oranges, lemons, grapefruit, and other citrus fruits, cantaloupes and other melons, tomatoes, cucumbers, sweet potatoes, apples, pears, avocados, eggs, and other similar foodstuffs.

These foodstuffs are normally cleaned soon after harvesting to remove surface dirt and sprayed materials. That cleansing operation frequently removes some of the natural protective oils and waxes from the rind or skin and reduces the protection offered by the natural covering. It is therefore preferred to carry out the coating procedure of this invention as soon as possible after cleansing has been achieved.

The latexes useful in this invention are those plasticized film-forming latexes prepared by the emulsion polymerization of vinylidene chloride and acrylonitrile in certain monomeric ratios. The preferred ratio is that wherein the vinylidene chloride is present in amount of from 88–91 percent of the weight of the monomers with correspondingly from 12 to 9 percent by weight of acrylonitrile making up the remainder. This preferred range of monomeric ratios has been found to provide the optimum properties for coating fresh foodstuffs. When the latex is one prepared from substantially less than 9 percent by weight of acrylonitrile the resulting film is more brittle and is impervious to moisture vapor. When more than 12 percent acrylonitrile is used in preparing the latex the moisture vapor transmission is too great to provide maximum protection.

The latexes may be prepared by any conventional emulsion polymerization procedure. In a typical procedure the monomeric material is dispersed into an aqueous phase containing a water-soluble polymerization catalyst, such as potassium persulfate, hydrogen peroxide, and the like, and a small amount of a water dispersible emulsifying agent. Such emulsifying agents are known and for the monomers of the present invention the best results are obtained using surface active materials of the anionic classification. Typical of those materials are the sodium alkyl sulfates, the alkyl aryl sulfonates, and the like. In conventional emulsion polymerizations the emulsifying agent is used in a concentration of from 1 to 5 percent based on the weight of monomeric material. Following dispersion of the monomeric material in the aqueous phase the emulsion is subjected to a temperature of from about 35 to 70° C. while agitated until polymerization is substantially complete. After polymerization the latex is filtered to remove any precoagulum. It is a common practice in the latex art to stabilize the freshly prepared latex to storage and mechanical shear by incorporating a small amount of additional surface active agent into the latex.

It is necessary, if continuous coherent films are to be obtained from these latexes by simple deposition and air drying, to incorporate plasticizers into the latex. Several useful plasticizers for use with vinylidene chloride-acrylonitrile polymers are known. Examples of such plasticizers are acetyl triethyl citrate, acetyl tributyl citrate, acetyl tributyl citrate, butylphthalylbutyl glycolate, ethyl phthalyl ethyl glycolate, diisobutyl adipate, and other similar esters. It is preferred to use these plasticizers in a concentration of from 5 to 10 percent of the weight of polymer present in the latex.

It is most economical to prepare polymer latexes with as high a concentration as possible of polymeric solids, and latexes having 50 percent solids are commonly prepared. However, for purposes of this invention it is preferred to use latexes having from 10 to 25 percent by weight of solids and such concentrations are easily obtained by diluting latexes of higher solids content.

Although the latexes of this invention dry into a transparent coating it may be desirable to add coloring materials, such as vegetable dyes, to the latex for added consumer appeal. Those materials may be so added by dissolving the dye in the plasticizer and adding both materials simultaneously to the latex. It is also possible to add known microorganism controlling agents, such as fungicides, disinfectants, and the like.

In practicing the invention the washed foodstuff is completely covered with the latex composition in an amount that will adhere to the foodstuff. A convenient procedure is to dip the foods into a bath of the latex composition and to allow the excess to drain. By such a procedure the costly and complicated spraying equipment is eliminated. The coated foodstuff is then allowed to air dry to form a continuous coherent film about the foodstuff. Although not necessary it has been found that brief exposure to hot air shortens the drying time. However, care must be exercised that the exposure to the hot air is not so long as to damage the foodstuff.

The most economical and convenient procedure in carrying out the foodstuff coating operation is to employ continuous sequential steps. In the prior waxing methods the foodstuff was washed, dried, waxed, and dried again. In the process of this invention the first drying step may be eliminated and the foodstuff passed directly from the washing step to the latex coating step. If necessary, due to dilution of the solids by the wash water carried over, the solids content of the latex bath may be restored by intermittently adding a concentrate of a latex of higher solids content than the bath.

By means of this process perishable foodstuffs are protected against dehydration, oxidation, and microorganism growth and thus the merchantable life of the foodstuff from harvest to consumption is greated extended. In addition the latex compositions of this invention dry to continuous coherent films having a high gloss, so that brushing or other polishing procedures are eliminated. Also these compositions are based solely upon an aqueous dispersive medium eliminating costly, flammable, and toxic organic solvents. Further, the added time consuming and costly step of solution preparation and maintenance is eliminated.

The operation and advantages of the process and of the latex compositions will be evident from the following illustrative example wherein all parts and percentages are by weight.

A bath of a latex composition was prepared by diluting 2 parts of a latex composition consisting of 90 parts of a latex prepared from 89 percent of vinylidene chloride and 11 percent acrylonitrile and which contained 50 percent non-volatile solids and to which had been added 10 parts of acetyl tributyl citrate as a plasticizer, with 3 parts of water to give a composition having a non-volatile solids content of about 20 percent. Oranges were dipped into the latex, drained, and allowed to air dry. The dried oranges had a glossy appearance. The coated oranges were tested for their rates of dehydration by exposing them to air at 23° C. in a relative humidity of 15-30 percent for 15 days. Uncoated oranges were used as a control. The results are listed below.

| | Percent Loss in Weight Due to Dehydration | |
|---|---|---|
| | 5 days | 15 days |
| Untreated oranges | 5.0 | 12.8 |
| Treated oranges | 2.6 | 7.2 |

The coatings of this invention can thus be seen to retard effectively the rate of dehydration of oranges.

When oranges were coated with latexes prepared from certain copolymers of styrene and butadiene, plasticized polystyrene, and plasticized latexes prepared from 85 percent vinylidene chloride and 15 percent acrylonitrile there was no effective protection provided for those oranges.

Eggs were likewise treated with the above latex composition of this invention with the following results.

| | Percent Weight Loss | | |
|---|---|---|---|
| | 5 days | 11 days | 15 days |
| Untreated eggs | 2.06 | 4.2 | 5.6 |
| Treated eggs | 1.03 | 1.9 | 2.9 |

As with the experiments with oranges, the latex compositions of this invention retard the dehydration rate of eggs.

We claim:
1. A process of protecting perishable foodstuffs having a natural protective covering which is normally disposed of prior to consumption from rapid dehydration consisting of the steps of completely coating the washed foodstuff with a film-forming latex composition prepared by the emulsion polymerization of from 88 to 91 percent by weight of vinylidene chloride together with from 12 to 9 percent by weight of acrylonitrile, said latex composition further containing plasticizing amounts of a plasticizer for said copolymer, and allowing the coating to dry to a continuous coherent film completely enveloping said foodstuff.

2. The process claimed in claim 1 wherein said washed foodstuff is completely coated with said latex composition by immersing said washed foodstuff in a bath of said latex composition and allowing the coated foodstuff to drain.

3. The process claimed in claim 1 wherein said coated foodstuff is allowed to air dry.

4. The process claimed in claim 1 wherein said film-forming latex composition contains from 10 to 25 percent by weight of non-volatile solids.

References Cited in the file of this patent
UNITED STATES PATENTS

| 2,333,887 | Redlinger | Nov. 9, 1943 |
| 2,538,002 | Irons et al. | Jan. 16, 1951 |
| 2,538,737 | Stanton et al. | Jan. 16, 1951 |
| 2,563,079 | Smith | Aug. 7, 1951 |
| 2,606,894 | Pitzl | Aug. 12, 1952 |
| 2,651,626 | Nie | Sept. 8, 1953 |
| 2,658,052 | Signer et al. | Nov. 3, 1953 |